United States Patent Office 3,477,864
Patented Nov. 11, 1969

3,477,864
PROCESS FOR COATING PHARMACEUTICAL PREPARATIONS WITH A HYDROXY PROPYL METHYL CELLULOSE-SEALING AGENT MOISTURE-PREVENTING FILM
Yoji Tuji, Osaka, Japan, assignor to Sumitomo Chemical Co., Ltd., Osaka, Japan
No Drawing. Filed Apr. 25, 1966, Ser. No. 544,687
Claims priority, application Japan, May 7, 1965, 40/27,191
Int. Cl. C09d 3/08, 3/18, 3/80
U.S. Cl. 106—151                                2 Claims

ABSTRACT OF THE DISCLOSURE

A composition useful for applying a moisture-preventing coating on tablets comprising hydroxypropylmethylcellulose, of which the viscosity in 2 weight percent aqueous solution is below 10 cps. at 20° C., dissolved in a mixture of at least one low boiling aliphatic halide and at least one other solvent, which may be an alcohol, mixtures of alcohol and a ketone or mixtures of water and an alcohol, and a sealing agent which may be a copolymer of butyl methacrylate and dimethylaminoethly methacrylate, shellac or a prolamin. The present disclosure also provides for a process of coating tablets with the above composition.

---

The present invention relates to a process for coating pharmaceutical preparations such as tablets, pills and granules with a moisture-preventing and thermostable film to enhance the moisture barrier, facilitate the administration, preserve the beautiful appearance and make it possible to package them easily with hot-processing materials.

In recent years, tablets, pills, granules and the like are much often required to be coated depending on their chemical and physical properties and their use. Although a number of compositions for coating are known, they can not always furnish satisfactory moisture barrier, disintegration property and thermostability to such preparations.

Namely, when preparations are coated with a composition containing polyethylene glycol 2,000 to 6,000 as the principal ingredient, the sticking due to the hygrosropicity occurs at the critical relative humidity of about 70%. As the films adhere together even under a tepid condition, the strip packaging with a heat sealer encounters difficulty.

When polyoxyethylene polymers (molecular weight more than 20,000) are employed, the viscosity of the coating solution is high. Due to its threading property, the coating operation is effected with difficulty and, in most cases, the coating by spraying hardly accomplished.

Moreover, most of synthetic and natural resins used for coating are easily soluble in organic solvents but sparingly soluble in water. Since the most widely used cellulose acetate phthalate does not dissolve in water and gastric juice and dissolves in intestinal juice, it cannot be properly used for coating such medicines as desired to exert rapidly the remedial effect.

The present inventors have studied on the process for coating tablets with a film having no disadvantages as mentioned above. As the result, there has been discovered an excellent film which is moisture-proof, unchanged on heating about 65° C., rapidly disintegrated in water or artificial gastric junce and of smooth and glossy surface, the said film being formed by dissolving in a mixture of a low-boiling aliphatic halide solvent such as dichloromethane and a low-boiling organic solvent such as methanol or ethanol, hydroxypropylmethylcellulose of which the viscosity in 2% aqueous solution is below 10 cps. at 20° C., adding thereto a dimethylaminoacrylate resin, shellac or a prolamin, i.e. zein, with or without a coloring agent, a plasticizer, a polishing material, a seasoning and the like, spraying the resultant coating solution on tablets rolling in a coating pan according to the impacted or compressed air process, drying and effecting repeatedly the latter two operations.

The hydroxypropylmethylcellulose used in the present invention is a cellulose derivative which contains about 7 to 12 weight percent of hydroxypropyl groups and about 28 to 30 weight percent of methoxy groups and the viscosity in 2% aqueous solution is below 10 cps. at 20° C. Thus, even when used at a high concentration, it does not hinder the coating operation so that the time for processing is shortened, the solvent saved, the procedure for coating much simplified and a uniform and smooth film formed easily.

The dimethylaminoacrylate resin employed in the present invention is a copolymer of butyl methacrylate and dimethylaminoethyl methacrylate. It dissolves below pH 2 and considerably swells at pH 3 to 6 to let water permeate through the same.

When employed alone, the former of the said two polymers shows poor moisture-proof property and, on coating by spraying, forms a less glossy surface. The latter has a peculiar color tone and causes difficulty in the coating operation. The combined use of these two polymers, however, can provide the most ideal film. The use of shellac or a prolamin, i.e. zein, in place of the dimethylaminoacrylate resin may also furnish an improved moisture-proof property and an excellent glossy surface to tablets without affecting their disintegration time in artificial gastric juice.

Furthermore, the film prepared by the present process may serve as a so-called protective coating for preventing tablets from penetration of water in the course of sugar or gelatin-coating.

The plasticizers which may be used in the present invention are esters such as dimethyl phthalate, dibutyl phthalate, triacetin and isopropyl myristate, surfactants of low HLB (Hydrophil Lipophile Balance) such as polyoxyethylene aliphatic acid esters, castor oil and the like. As the coloring agent, there may be employed a lake or a dye which is soluble in organic solvents. As the polishing material, there may be used one or more of natural and synthetic wax and waxlike substances such as carnauba wax, hardened castor oil and beeswax. It is the most effective to use them together with talc, magnesium stearate, calcium stearate, aluminum stearate or the like in suspension.

Table 1 illustrates that the combined use of hydroxypropylmethylcellulose with the dimethylaminoacrylate resin, shellac or zein enhances the moisture barrier of the formed film, compared with the single use of the said cellulose.

In Tables 2 to 4, the moisture barrier, the thermostability and the facility of disintegration of the coated tablets prepared by the present process are compared with those of the coated tablets prepared by the heretofore most widely adopted coating process employing polyethylene glycol 6,000 and cellulose acetate phthalate as the principal ingredients.

EXAMPLE 1

Twenty grams of 12.5 weight percent solution of dimethylaminoacrylate resin in a mixture of acetone and isopropanol and 20 g. of hydroxypropylmethylcellulose are dissolved in a mixture of 220 g. of ethanol and 80 g. of trichloroethylene. To the resultant mixture, there are added 1 g. of castor oil, 6 g. of diethyl phethalate and a hot solution of 2 g. of carnauba wax and 1 g. of hardened castor oil in 60 g. of trichloroethylene. In the resulting mixture, there are suspended 2 g. of magnesium stearate, 3 g. of titanium dioxide and 15 g. of talc by the aid of a homogenizer or the like. An appropriate amount of the thus obtained coating solution is sprayed with an air spray gun of 1 to 1.2 mm$\phi$ on 3,000 convex-surface tablets consisting of 22 parts of sodium chloride, 22 parts of sucrose, 33 parts of lactose, 22 parts of corn starch and 1 part of magnesium stearate and rolling in a sugar coating pan, each tablet being 9 mm. in diameter and 280 mg. in weight. Instantly after the spraying is completed, hot air is blown into the pan to dry the tablets. This procedure is repeated to form a film weighing 15 to 20 mg. per tablet.

The coated tablets thus prepared have a white, glossy and graceful appearance. Their moisture barrier, thermostability and facility of disintegration are satisfactory as shown in Tables 2, 3 and 4.

EXAMPLE 2

Twenty grams of 12.5 weight percent solution of dimethylaminoacrylate resin in a mixture of isopropanol and acetone and 20 g. of hydroxypropylmethylcellulose are dissolved in 80 g. of ethanol and 80 g. of trichloroethylene. Separately, there is prepared a homogeneous suspension of 2 g. of magnesium stearate, 3 g. of titanium dioxide, 15 g. of talc, 0.1 g. of saccharin sodium, 0.9 g. of sodium cyclamate and 1 to 2 g. of a color lake in 40 g. of ethanol. The suspension thus obtained is mixed with the above prepared solution. To the resulting mixture, there is added a hot solution of 3 g. of isopropyl myristate, 3 g. of polyoxyethylene stearate, 1 g. of castor oil, 1.5 g. of carnauba wax and 1 g. of hardened castor oil in 60 g. of trichloroethylene. The tablets employed in Example 1 are coated with the resultant coating solution in the similar manner to produce the coated tablets having a glossy and graceful appearance. Their moisture barrier, thermostability and facility of disintegration are satisfactory as shown in Tables 1, 2, 3 and 4.

EXAMPLE 3

Twenty grams of hydroxypropylmethylcellulose and 5 g. of medicinal shellac are dissolved in a mixture of 80 g. of ethanol and 80 g. of trichloroethylene. Separately, there is prepared a homogeneous suspension of 2 g. magnesium stearate, 2 g. of titanium dioxide, 15 g. of talc, 0.1 g. of saccharin sodium, 0.9 g. of sodium cyclamate and 1 to 2 g. of a color lake in 40 g. of ethanol. To a mixture of the solution and the suspension prepared above, there is added a hot solution of 6 g. of diethyl phthalate, 1 g. of castor oil, 1.5 g. of carnauba wax and 1 g. of hardened castor oil in 60 g. of trichloroethylene. The tablets used in Example 1 are coated with the resultant coating solution in the similar manner to produce the coated tablets having a glossy and graceful appearance. Their moisture barrier, thermostability and facility of disintegration are satisfactory as shown in Tables 1, 2, 3 and 4.

EXAMPLE 4

Twenty grams of hydroxypropylmethylcellulose and 5 g. of zein are dissolved in a mixture of 80 g. of ethanol, 80 g. of trichloroethylene and 5 g. of water. Separately, there is prepared a homogeneous suspension of 2 g. of magnesium stearate, 2 g. of titanium dioxide, 15 g. of talc, 0.1 g. of saccharin sodium, 0.9 g. of sodium cyclamate and 1 to 2 g. of a color lake in 40 g. of ethanol. To a mixture of the solution and the suspension prepared above, there is added a hot solution of 6 g. of diethyl phthalate, 1 g. of castor oil, 1.5 g. of carnauba wax and 1 g. of hardened castor oil in 60 g. of trichloroethylene. The tablets used in Example 1 are coated with the resultant coating solution in the similar manner to produce the coated tablets having a glossy and graceful appearance. Their moisture barrier, thermostability and facility of disintegration are satisfactory as shown in Tables 1, 2, 3 and 4.

TABLE 1.—HYGROSCOPICITY TEST AT RELATIVE HUMIDITIES OF 75%, 82% and 91% at 37° C.

| Time | Uncoated tablets | | | Tablets coated with coating solution comprising hydroxypropylmethylcellulose as principal ingredient | | | Coated tablets obtained in Example 2 | | | Coated tablets obtained in Example 3 | | | Coated tablets obtained in Example 4 | | |
|---|---|---|---|---|---|---|---|---|---|---|---|---|---|---|---|
| | RH 75% | RH 82% | RH 91% | RH 75% | RH 82% | RH 91% | RH 75% | RH 82% | RH 91% | RH 75% | RH 82% | RH 91% | RH 75% | RH 82% | RH 91% |
| 2 hours | 1.05 | 1.21 | 1.28 | 0.34 | 0.45 | 0.56 | 0.18 | 0.19 | 0.22 | 0.14 | 0.16 | 0.21 | 0.16 | 0.19 | 0.23 |
| 4 hours | 1.57 | 1.39 | 1.62 | 0.62 | 0.73 | 0.83 | 0.31 | 0.35 | 0.41 | 0.22 | 0.27 | 0.33 | 0.26 | 0.31 | 0.39 |
| 24 hours | 5.95 | 6.05 | 8.91 | 3.25 | 4.35 | 5.17 | 1.63 | 1.68 | 2.65 | 1.38 | 1.56 | 2.61 | 1.62 | 1.70 | 2.93 |
| 48 hours | 10.20 | 9.53 | 28.0 | 6.20 | 7.42 | 19.50 | 3.24 | 3.51 | 6.54 | 2.03 | 3.10 | 9.15 | 2.57 | 3.25 | 10.03 |
| 72 hours | 15.00 | 13.20 | 33.6 | 8.40 | 9.56 | 23.8 | 4.31 | 4.73 | 10.15 | 3.25 | 4.02 | 10.20 | 3.75 | 4.35 | 12.50 |
| 96 hours | 20.00 | 17.3 | 44.0 | 12.70 | 14.32 | 32.5 | 6.35 | 7.23 | 15.28 | 5.51 | 6.35 | 15.59 | 5.65 | 6.83 | 17.05 |

TABLE 2.—THERMOSTABILITY TEST

| Time | Tablets coated with coating solution comprising cellulose acetate phthalate and polyethylene glycol 6,000 as principal ingredients | | | Coated tablets obtained by the present process | | |
|---|---|---|---|---|---|---|
| | | | | Example 1 | | |
| | 49° C. | 55° C. | 65° C. | 49° C. | 55° C. | 65° C. |
| 2 hours | Unchanged | Unchanged | Sticked | Unchanged | Unchanged | Unchanged. |
| 6 hours | do | Sticked | Surface partly dissolved | do | do | Do. |
| 12 hours | do | do | do | do | do | Do. |
| 24 hours | Sticked a little | do | do | do | do | Do. |

| | Coated tablets obtained by the present process | | | | | | | | |
|---|---|---|---|---|---|---|---|---|---|
| | Example 2 | | | Example 3 | | | Example 4 | | |
| Time | 49° C. | 55° C. | 65° C. | 49° C. | 55° C. | 65° C. | 49° C. | 55° C. | 65° C. |
| 2 hours | Unchanged | Unchanged | Unchanged | Unchanged | Unchanged | Unchanged | Unchanged | Unchanged | Unchanged. |
| 6 hours | do | do | do | do | do | do | do | do | Do. |
| 12 hours | do | do | do | do | do | do | do | do | Do. |
| 24 hours | do | do | do | do | do | do | do | do | Do. |

TABLE 3

| Time | Tablets coated with coating solution comprising cellulose acetate phthalate and polyethylene glycol 6,000 as principal ingredients | | | Coated tablets obtained in Example 1 | | |
|---|---|---|---|---|---|---|
| | RH 75% | RH 82% | RH 96% | RH 75% | RH 82% | RH 96% |
| 2 hours | Unchanged | Sticked | Sticked | Unchanged | Unchanged | Unchanged. |
| 6 hours | Sticked | Surface dissolved | Surface dissolved | do | do | Do. |
| 12 hours | do | do | do | do | do | Do. |
| 24 hours | Surface dissolved | do | Partly disintegrated | do | do | Do. |
| 48 hours | do | do | do | do | do | Less glossy. |
| 72 hours | do | Partly disintegrated | Almost disintegrated | do | Less glossy | Swelled. |
| 96 hours | do | do | do | do | Not glossy | Cracked. |

| Time | Coated tablets obtained in Example 2 | | | Coated tablets obtained in Example 3 | | | Coated tablets obtained in Example 4 | | |
|---|---|---|---|---|---|---|---|---|---|
| | RH 75% | RH 82% | RH 96% | RH 75% | RH 82% | RH 96% | RH 75% | RH 82% | RH 96% |
| 2 hours | Unchanged | Unchanged | Unchanged | Unchanged | Unchanged | Unchanged | Unchanged | Unchanged | Unchanged. |
| 6 hours | do | do | do | do | do | do | do | do | Do. |
| 12 hours | do | do | do | do | do | do | do | do | Do. |
| 24 hours | do | do | Less glossy | do | do | do | do | do | Less glossy. |
| 48 hours | do | Less glossy | do | do | do | Less glossy | Less glossy | do | do | Do. |
| 72 hours | do | Not glossy | Swelled | do | Less glossy | do | do | Less glossy | Swelled. |
| 96 hours | do | Swelled | Cracked | do | do | Swelled | do | do | Cracked. |

NOTE.—RH = Relative Humidity.

TABLE 4

| | Uncoated tablets | Tablets coated with coating solution comprising cellulose acetate phthalate and polyethylene glycol 6,000 as principal ingredients | Coated tablets obtained by the present process | | | |
|---|---|---|---|---|---|---|
| | | | Example 1 | Example 2 | Example 3 | Example 4 |
| Water | 5'–6' | 30'–40' | 8'–10' | 8'–10' | 10'–15' | 10'–12' |
| Artificial gastric juice | 5'–6' | 40'–60' | 8'–10' | 8'–10' | 10'–15' | 10'–12' |

What is claimed is:

1. A process for applying a moisture-preventing coating on solid pharmaceutical preparation in the form of tablets, pills and granules, which comprises (1) preparing a coating composition by dissolving hydroxypropylmethylcellulose, of which the viscosity in 2 weight percent aqueous solution is below 10 cps. at 20° C., in a mixture of at least one low boiling aliphatic halide and at least one low boiling organic solvent selected from the group consisting of alcohols, mixtures of alcohols and ketones and mixtures of alcohol and water, and adding to the resulting solution a sealing agent selected from the group consisting of a copolymer of butyl methacrylate and dimethylaminoethyl methacrylate, shellac or a prolamin, (2) spraying the coating composition onto the solid pharmaceutical preparations being rolled in a usual coating pan, (3) drying the coated preparations and (4) repeating the spraying and drying.

2. A composition comprising hydroxypropylmethylcellulose, of which the viscosity in 2 weight percent aqueous solution is below 10 cps. at 20° C., dissolved in a mixture of at least one low boiling aliphatic halide and at least one low boiling organic solvent selected from the group consisting of alcohols, mixtures of alcohols and ketones and mixtures of alcohol and water, and a sealing agent selected from the group consisting of a copolymer of butyl methacrylate and dimethyl-aminoethyl methacrylate, shellac or a prolamin.

References Cited

UNITED STATES PATENTS

| 2,246,779 | 6/1941 | Coleman | 106—153 |
| 2,433,244 | 12/1947 | Springett | 167—82.5 |
| 2,887,440 | 5/1959 | Greminger et al. | 167—82.5 |
| 2,941,893 | 6/1960 | McConnaughay | 260—17 |
| 2,948,626 | 8/1960 | Sanders | 167—82.5 |
| 3,132,075 | 5/1964 | Johnson | 260—17 |
| 3,116,205 | 12/1963 | Helig et al. | 260—17 |
| 3,244,596 | 4/1966 | Lach | 167—82.5 |
| 3,282,790 | 11/1966 | Johnson | 424—35 |

OTHER REFERENCES

Chem Abstract: 65:3678d, f, Westerburg, Tablet coat- and Neth, appl. 6502190.

HAROLD D. ANDERSON, Primary Examiner

E. WOODBERRY, Assistant Examiner

U.S. Cl. X.R.

106—173; 260—17; 424—35